United States Patent [19]

Bacon

[11] Patent Number: 5,054,071

[45] Date of Patent: Oct. 1, 1991

[54] VOLUME CONTROL FOR OPTIMUM TELEVISION STEREO SEPARATION

[75] Inventor: Kinney C. Bacon, Duluth, Ga.

[73] Assignee: Scientific-Atlanta, Inc., Atlanta, Ga.

[21] Appl. No.: 306,010

[22] Filed: Feb. 3, 1989

[51] Int. Cl.$^5$ .......................... H04H 5/00; H04N 5/44
[52] U.S. Cl. .................................. 381/12; 358/194.1; 455/4
[58] Field of Search .................. 381/1, 10, 11, 12, 104, 381/109; 358/144, 197, 194.1; 455/4, 232

[56] References Cited

U.S. PATENT DOCUMENTS

| | | | |
|---|---|---|---|
| 2,980,766 | 4/1961 | Nulton, Jr. et al. | 381/1 |
| 4,239,937 | 12/1980 | Kampmann | 381/28 |
| 4,536,798 | 8/1985 | Reid, Jr. et al. | 358/194.1 |
| 4,591,622 | 2/1986 | Davidov et al. | 358/194.1 |
| 4,591,915 | 5/1986 | Davidov et al. | 358/194.1 |
| 4,603,349 | 7/1986 | Robbins | 358/86 |
| 4,646,150 | 2/1987 | Robbins et al. | 358/144 |
| 4,652,924 | 3/1987 | Davidov | 358/194.1 |
| 4,691,358 | 9/1987 | Bradford | 381/12 |
| 4,748,501 | 5/1988 | Long | 358/86 |
| 4,748,669 | 5/1988 | Klayman | 381/25 |
| 4,751,574 | 6/1988 | Mogi et al. | 358/194.1 |
| 4,954,899 | 9/1990 | Tanabe et al. | 358/194.1 |

FOREIGN PATENT DOCUMENTS 55-4167(A) 1/1980 Japan .

OTHER PUBLICATIONS

"Cable and BTSC Stereo" by James O. Farmer, IEEE Transactions on Consumer Electronics, vol. CE-33, No. 1, Feb. 1987.
"Stereo Sound for TV" by Alex Best, International TV Symposium, Symposium Record, Jun. 1989.
Patent Abstracts of Japan, vol. 4, No. 32 (E-2)(514), Mar. 19, 1989.
Frank McClatchle, "How BTSC Brings Stereo to the TV Set", published Mar. 1988, Communications Technology, pp. 49, 50, 52 and 54.
Luis A. Rovira, "BTSC Stereo Separation on the Cable" presented at an SMPTE Meeting.
Mitsubishi Linear IC M5144P data sheets having an unknown publication date.
1989 NCTA Technical Papers, pp. 15–20, The Importance of Setting and Maintaining Correct Signal and Modulation Levels in a CATV System Carrying BTSC Stereo Signals, by Chris Bowick.

Primary Examiner—Forester W. Isen
Attorney, Agent, or Firm—William A. Marvin

[57] ABSTRACT

Volume control for use in a cable television set top converter or the like is calibrated for optimum television stereo channel separation. The volume control controls the volume to predetermined levels. One of the predetermined levels is a particular level calibrated for optimum stereo separation. An indicator on the converter indicates the optimum stereo separation volume level. When an internal VCR timer turns on the set top converter, the set top converter is forced to the optimum stereo separation volume level. The calibration is performed during manufacture and ensures that the indicated volume level for optimum stereo separation is indeed the optimum volume level.

54 Claims, 5 Drawing Sheets

VOLUME CONTROL FOR OPTIMUM TELEVISION STEREO SEPARATION

BACKGROUND OF THE INVENTION

1. Technical Field

The present invention generally relates to the field of volume control and more particularly, is directed to television signal volume control having optimum stereo separation.

2. Related Art

Figure 1:
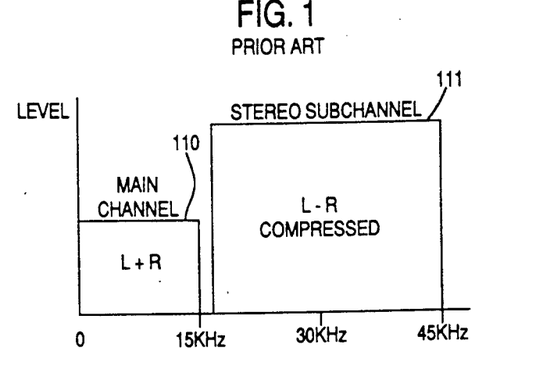
FIG. 1 is a waveform diagram illustrating the audio spectrum of a conventional baseband stereo signal.

A conventional television stereo audio baseband spectrum is illustrated in FIG. 1. This spectrum is representative of BTSC stereo (Broadcast Television System Committee) commonly known as MTS stereo (Multichannel Television Sound). The MTS audio spectrum comprises main channel 110 and stereo subchannel 111. The MTS spectrum is compatible with both mono and stereo television. A mono television will receive and play only main channel 110. A stereo television will receive main channel 110 and stereo subchannel 111 and combine them to separately play left and right stereo sound channels. Main channel 110 carries the sum of the left and right channels (L+R). Stereo subchannel 111 carries the difference of the right from the left channel (L−R). Stereo subchannel 111 is compressed by DBX® signal compressors and expanders available from BSR North America, Ltd., as used in commercially available MTS encoders and decoders. The compression of (L−R) stereo subchannel 111 occurs on the MTS stereo signal when modulated for transmission to a television. At the television, an MTS decoder will decompress the (L−R) stereo subchannel 111. After decompression the MTS decoder combines (L+R) main channel 110 with (L−R) stereo subchannel 111 to yield the separate left and right channels of stereo sound. Main channel 110 and stereo subchannel 111 are combined according to equations 1 and 2:

$$(L+R)+(L-R)=2L \quad (1.)$$

$$(L+R)-(L-R)=2R \quad (2.)$$

After decoding by the MTS decoder, these separate left and right channels can then be adjusted in amplitude for television volume control.

A problem has been discovered when one desires to adjust the volume of an encoded stereo television signal prior to expansion. A stereo television signal prior to decoding contains a compressed stereo channel such as stereo subchannel 111. When an audio baseband signal similar to FIG. 1 is attenuated to adjust volume, the compressed subchannel 111 is attenuated as equally as noncompressed channel 110. However, after expansion of subchannel 111 by a stereo decoder, subchannel 111 can have nearly double the attenuation as main channel 110. Poor stereo separation thus results when the doubly attenuated (L−R) subchannel 111 is combined with (L+R) main channel 110.

Figure 2A:
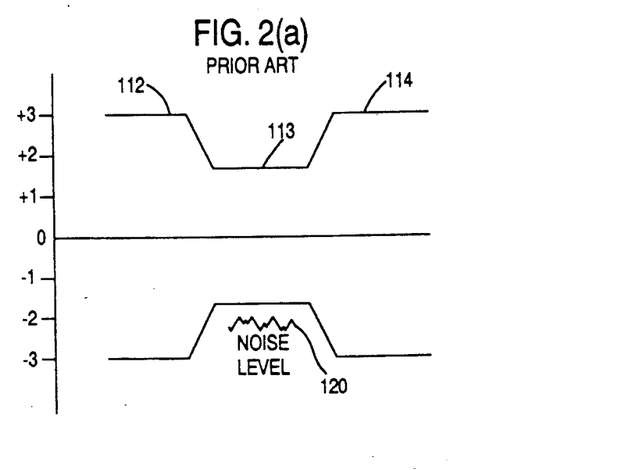
FIG. 2(a) is a waveform diagram illustrating the conventional compression and expansion of a conventional stereo subchannel waveform.
Figure 2B:
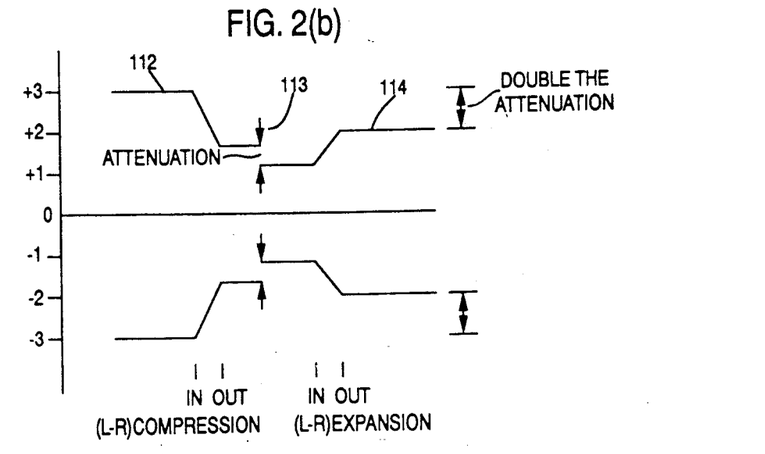
FIG. 2(b) is a waveform diagram illustrating how attenuation of the compressed stereo subchannel effects the attenuation of the expanded stereo subchannel.

FIG. 2(a) illustrates compression and expansion without attenuation while FIG. 2(b) illustrates the double attenuation effects of compression and expansion with attenuation. In FIGS. 2(a) and 2(b), subchannel 111 is illustrated prior to compression at 112 compressed at 113 and expanded at 114. FIG. 2(b) illustrates attenuation of the compressed signal at 113 creating double the attenuation of expanded signal 114. Equations 3 and 4 demonstrate how attenuation A of main channel 110 and double attenuation 2A of stereo subchannel 111 provide for poor stereo separation:

$$A(L+R)+2A(L-R) \quad (3.)$$

$$A(L+R)-2A(L-R)=A(3R-L) \quad (4.)$$

Compressing a channel for transmission reduces noise. The compression used in MTS stereo compresses stereo subchannel 111 as illustrated in FIGS. 2(a) and 2(b). Compressed signal 113 is illustrated raised above noise level 120 to reduce noise upon transmission.

Figure 3:
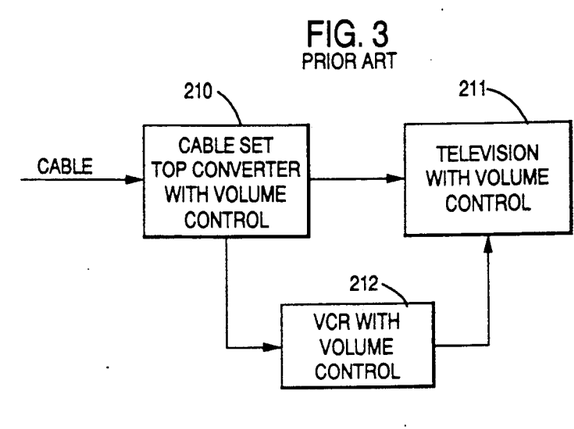
FIG. 3 is a schematic block diagram illustrating the conventional arrangement of a cable set top converter connected to a television or a video cassette recorder all having variable volume control.

Often in the home, audio volume is adjusted prior to tuning and/or stereo decoding in a television. Set top cable TV converters 210 often perform audio volume control in addition to channel tuning prior to reception by television 211, as illustrated in FIG. 3. Usually the set top converter 210 will have a remote volume and channel control in addition to television 211 having a remote control. Additionally, it is possible that video cassette recorder (VCR) 212 may perform audio volume control prior to reception by television 211. In such an instance a home viewer would have volume control on any of set top converter 210, VCR 212 or television 211.

The discovered stereo separation problem can arise in the above configuration of FIG. 3 when set top converter 210 adjusts audio volume by attenuating the non-compressed (L+R) main channel and the compressed (L−R) stereo subchannel. When the (L−R) stereo subchannel is expanded and combined with the non-compressed (L+R) main channel, poor stereo separation occurs.

Set top converters known in the art are only capable of adjusting volume when their power is on. This can pose a problem should the volume be preset at a high level. When the converter is turned on a disturbing high level sound can result on the speakers associated with a television. Furthermore, prior to turning on the set top converter, a user had no way of determining the volume level.

A set top converter with an internal video cassette recorder (VCR) timer turns on the set top converter at a preprogrammed time and tunes to a preprogrammed channel for taping at VCR 212. Conventionally, when a set top converter is turned on, the volume is set at a previously manually set volume level. This posed a problem since use of the VCR timer would not always provide optimum stereo separation.

SUMMARY OF THE INVENTION

The present invention solves the above-mentioned problems having advantages and features not heretofore possible according to the following objects of the invention:

An important object of the present invention is to provide a volume control having optimum stereo separation.

Another object of the present invention is to provide a volume control having display of the volume setting.

Another object of the present invention is to provide a volume control capable of indicating the optimum volume setting.

Another object of the present invention is to provide a volume control capable of being calibrated to an optimum volume setting.

Another object of the present invention is to provide a volume control with an indicator for indicating attainment of optimum stereo separation.

Another object of the present invention is to provide a volume control in a set top converter with a switched outlet or the like capable of volume adjustment when the switched outlet is off.

Another object of the present invention is to provide a volume control in a set top converter with a switched outlet or the like capable of volume level display when the switched outlet is off.

A further object of the present invention is to provide a volume control in a timer enabled device capable of setting the volume at the optimum volume level upon enablement by the timer.

A further object of the present invention is to provide a volume control having nearly optimum signal-to-noise ratio and distortion.

A further object of the present invention is to provide a volume control having optimum stereo separation together with a nearly optimum signal-to-noise ratio and distortion level.

A further object of the present invention is to provide a volume control having an indicator for indicating optimized stereo separation, signal-to-noise ratio and distortion level.

In accordance with the present invention, a set top converter is provided for controlling audio volume to predetermined levels with a particular level providing optimum stereo separation. A demodulator demodulates the set top converter input to provide a baseband audio signal. An electronic volume control adjusts the amplitude of the baseband audio signal under control by a microprocessor controller. After volume control, the baseband audio signal is remodulated for transmission to a television or the like. A user adjusts volume control via a keyboard and display which connect to the microprocessor controller. Optimum stereo separation is achieved when the overall gain of the set top converter is set to the particular level. When the microprocessor controller sets the particular level for optimum stereo separation, an optimum stereo separation indication is provided on the display. In use, optimum stereo separation can be achieved by adjusting the volume until an optimum stereo separation indication is displayed.

The gain of the set top converter is calibrated by trimming the gain of the electronic volume control using a variable attenuator. Adjustment and display of the volume is possible by the microprocessor controller even when a switched outlet or the like on the set top converter is off. Furthermore, the microprocessor controller is programmed to set the volume at the optimum stereo separation level when the VCR timer turns on the set top converter.

The above-mentioned objects and features of the present invention will become apparent from the following description when read in conjunction with the drawings.

DETAILED DESCRIPTION OF THE PREFERRED EMBODIMENT

In the preferred embodiment, volume level is digitally controlled having 64 different levels of volume. These levels are numbered 0-63 and can be incremented up and down by the user of the set top converter. While the principles of the present invention are described in connection with a cable television set top converter, the principles may be equally applicable to video cassette recorders, broadcast satellite receiver/decoders, subscription television channel decoders or the like equipped with volume control. The numerical value for the volume level is preferably displayed on the set top converter, for example, according to the alternative displays of FIGS. 8(a)-8(d).

Figure 4A:
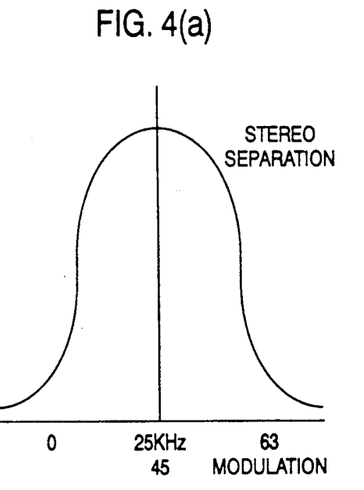
FIG. 4(a) is a waveform diagram illustrating the curve of stereo separation against frequency of modulation.
Figure 4B:
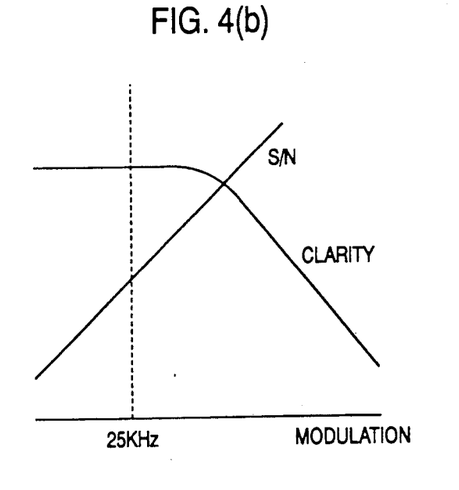
FIG. 4(b) is a waveform diagram illustrating signal-to-noise ratio and clarity of the audio signal output against frequency of modulation.
Figure 5:
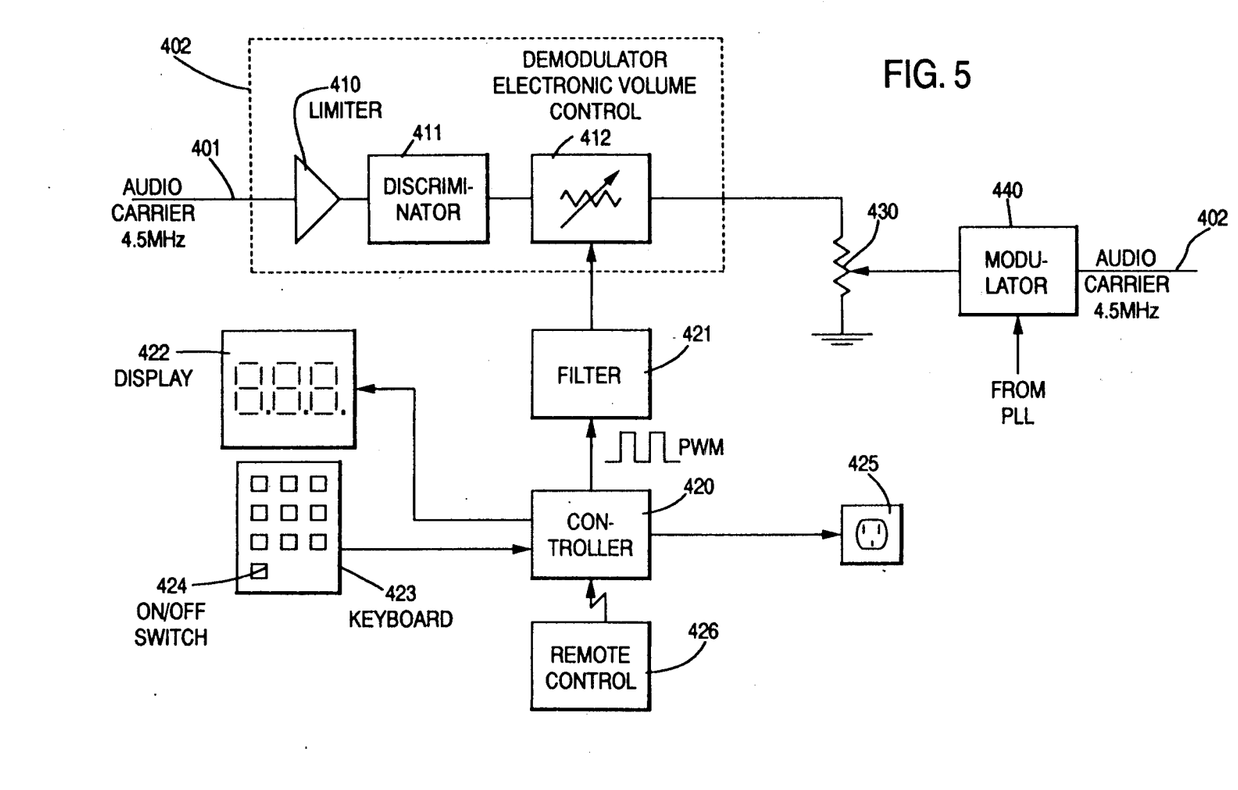
FIG. 5 is a schematic block diagram of a preferred embodiment of the present invention for volume control having optimum stereo separation.

FIG. 4(a) illustrates variations of volume level between 0 and 63 corresponding to the frequency modulation of the audio signal by modulator 440 of FIG. 5. As shown in FIG. 4(a), optimum stereo separation is achieved at a modulation of 25 kHz, corresponding to a volume level digitally indicated as 45. FIG. 4(b) illustrates the signal-to-noise ratio and the clarity of the output signal from the set top converter. The clarity curve typically represents the inverse of harmonic distortion. Harmonic distortion occurs when multiples of a frequency on a signal interfere with the signal. In FIG. 4(b), clarity worsens while signal-to-noise ratio improves as modulation frequency increases. A balance between distortion and signal-to-noise ratio is achieved near the intersection of the two curves. The point of intersection of the signal-to-noise ratio curve and the clarity curve is slightly beyond the 25 kHz point of optimum stereo separation.

Therefore, the present invention while operating at the optimum stereo separation point also operates at nearly optimum signal-to-noise ratio and distortion levels.

FIG. 5 illustrates a block diagram of the set top converter of the preferred embodiment of the present invention. Details of tuning, descrambling or other processing of either the audio or its associated video are not shown. The audio signal is modulated on a 4.5 MHz audio carrier in this example. Demodulator 402 demodulates the audio baseband signal from the audio carrier and comprises limiter 410, discriminator 411 and electronic volume control 412. After volume control by electronic volume control 412 and variable attenuator 430, the audio baseband signal is remodulated by modulator 440. Modulator 440 remodulates the baseband audio signal on the 4.5 MHz audio carrier, although other frequency audio carriers can be chosen.

Within demodulator 402, limiter 410 is an IF limiter amplifier receiving input 401 from an intercarrier detector (not shown). Discriminator 411 operates as an FM detector for demodulating the audio baseband signal from the 4.5 MHz audio carrier. Electronic volume control 412 is controlled by controller 420 via filter 421. Electronic volume control 412 electronically attenuates the amplitude of the demodulated audio baseband signal according to the voltage level input from filter 421. Demodulator 402 can be a TV sound IF demodulator such as Mitsubishi Linear Integrated Circuit M5144P.

Controller 420 controls the attenuation of electronic volume control 412 in accordance with volume levels commanded from keyboard 423. Display 422 displays a numeric value from 0 to 63 inclusive. The numeric value represents the volume level selected on keyboard 423 by the user. Although only 64 volume levels are used in the present invention, any number of discrete volume levels may be used. Even non-discrete volume control could be used in an analog system. Furthermore, other forms of display such as variable length bar indicators may be used instead of the numeric display of volume level.

Controller 420 outputs a pulse width modulated (PWM) signal. The duty cycle of the pulse width modulated signal controls the attenuation of electronic volume control 412. Filter 421 is a low pass filter or the equivalent that smooths the pulse width modulated (PWM) signal from controller 420. The smoothed pulse width modulated signal approximates a DC level for control of electronic volume control 412. Although the present invention uses a pulse width modulated signal filtered to a DC level to control electronic volume control 412, other means of electronic volume control may be used. For instance, controller 420 could output a DC level directly without pulse width modulation. Furthermore, a linear operational amplifier could be used in place of the electronic volume control for variable attenuation. The operational amplifier could operate in response to voltages, currents or resistance levels provided by a controller.

Variable attenuator 430 is preferably a trimming resistor. Variable attenuator 430 connects demodulator 402 to modulator 440. Together, variable attenuator 430 and electronic volume control 412 determine the total attenuation of the audio signal.

In the present invention, optimum stereo separation is achieved with unity gain on the stereo and baseband signal. With unity gain, the amplitude of (L−R) stereo subchannel 111 expanded and combined with the amplitude of (L+R) main channel 110 will be matched for optimum stereo separation. Nearly double the attenuation of stereo subchannel 111 is introduced upon expansion. Any gain other than unity gain upon expansion will double the attenuation of stereo subchannel 111. Non-unity gain will mismatch (L−R) subchannel 111 with (L+R) main channel 110 thus yielding poor stereo separation. Optimum stereo separation is thus achieved when the overall gain of the signal passing through the set top converter is unity.

Variable attenuator 430 can be adjusted to provide unity gain in conjunction with electronic volume control 412. The present invention arbitrarily chooses volume level 45 as the optimum stereo separation level. Any label other than the numeric label of 45 can be chosen to represent the optimum stereo separation level.

Upon fabrication of the set top converter, the set top converter must be calibrated by adjusting variable attenuator 430 for the optimum stereo separation at 45. To perform this adjustment, the set top converter is commanded on keyboard 423 to the level of 45. At this level, variable attenuator 430 is adjusted so that overall attenuation of the set top converter has unity gain. Thereafter, the set top converter exhibits unity gain and optimum stereo separation is achieved whenever a level of 45 is commanded by keyboard 423.

Figure 6:
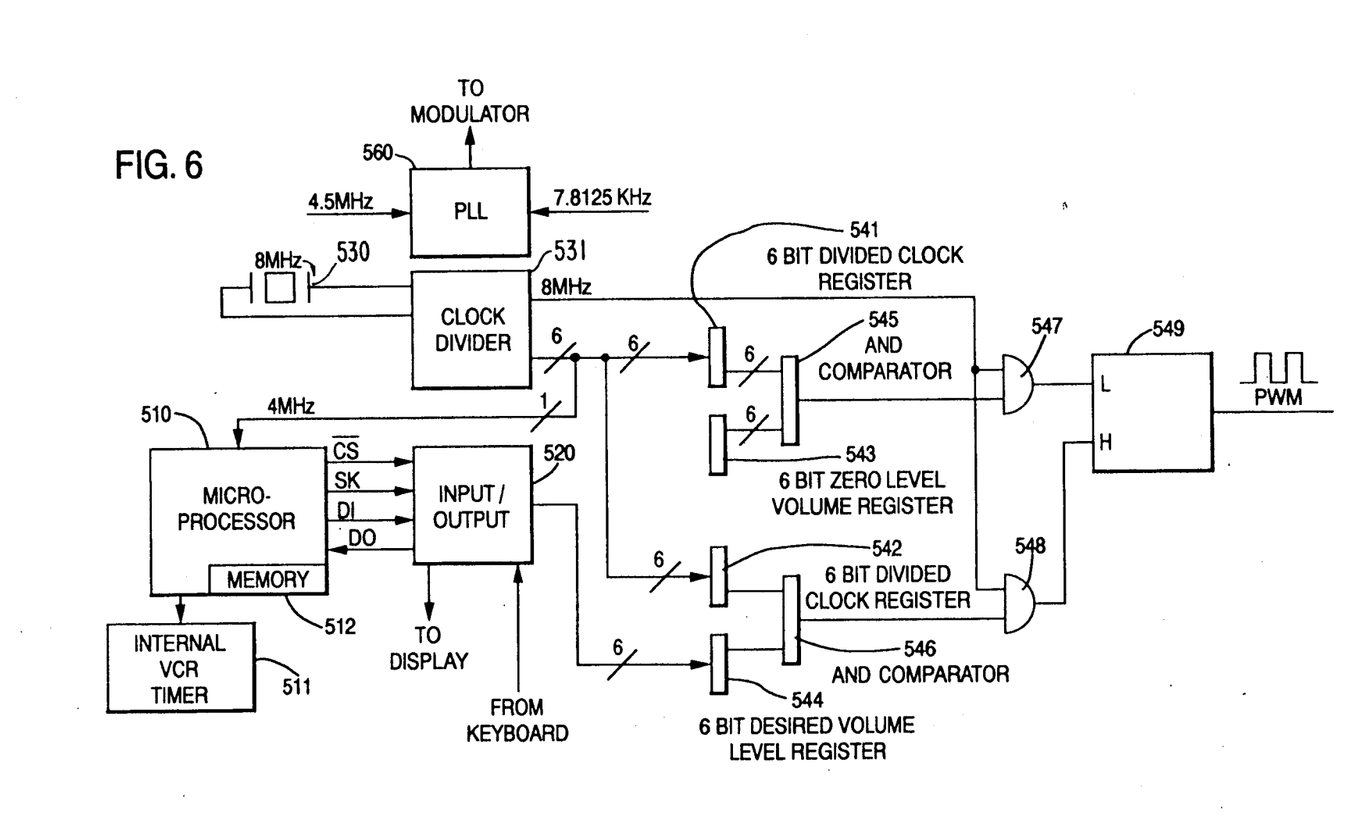
FIG. 6 is a schematic block diagram of a preferred embodiment of the present invention illustrating the details of controller 420 of FIG. 5 for providing the volume control with optimum stereo separation.
Figure 7:
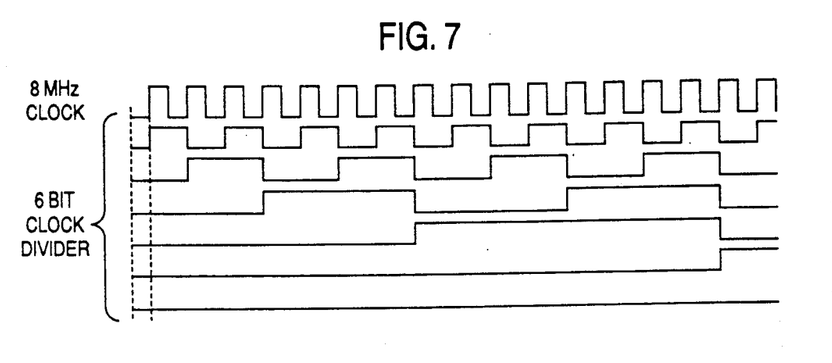
FIG. 7 is a timing diagram illustrating the output of six bit clock divider 531 of FIG. 6.

FIG. 6 illustrates the details of controller 420. Microprocessor 510 digitally controls the pulse width modulation circuits in accordance with information from keyboard 423 received via input/output 520 and stored in memory 512. The output of 8 MHz oscillator 530 is divided by clock divider 531 into a six bit count as illustrated in FIG. 7. In the preferred embodiment, the microprocessor is clocked by the once divided 4 MHz output of clock divider 531. The six-bit output of clock divider 531 is sequentially stored in six-bit divided clock registers 541, 542. A six-bit digital value corresponding to the zero volume level is stored in six-bit zero level volume register 543. Thus, six-bit zero level volume register 543 typically stores 000000. In response to the volume commanded on keyboard 423, microprocessor 510 stores a six-bit command volume level in six-bit desired volume level register 544. Comparators 545, 546 compare the value of their respective six-bit registers. The outputs of a comparators 545, 546 are masked by AND gates 547, 548 to prevent spurious signals. The output of AND gate 548 sets flip-flop 549 high while the output of AND gate 547 sets flip-flop 549 low. A pulse width modulated signal is thus output of flip-flop 549 having a pulse width dependent upon the six-bit desired volume level stored by microprocessor 510 in register 544. Thus, attenuation by electronic volume control 412 can be adjusted by the pulse width modulation circuitry of FIG. 6 via smoothing filter 421.

Preferably, the circuitry of FIG. 6 can be built on a custom integrated circuit. The pulse width modulation circuits can be built as described above or as any other pulse width modulation circuit known to those of skill in the art. The custom integrated circuit can additionally contain extra devices such as phase locked loop 560. Phase locked loop 560 is used in conjunction with modulator 440 for remodulating the audio carrier. Clock inputs of 4.5 MHz and 7.8125 kHz are preferred for this phase locked loop. These clock inputs may be derived by clock dividers instant to 8 MHz oscillator 530. Microprocessor 510 can be a separate device aside from a custom integrated circuit or incorporated in the custom integrated circuit. Furthermore, microprocessor 510 can be the only microprocessor of the set top converter or a separate microprocessor can be used only for the volume control circuitry.

Figure 8A:
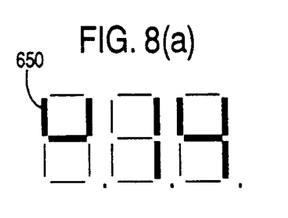
FIGS. 8(a)-8(d) illustrate alternative displays for optimum stereo separation and volume level indication.
Figure 8B:
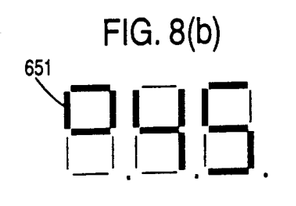
Figure 8C:
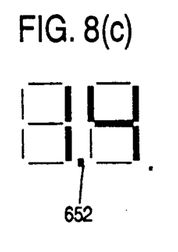
Figure 8D:
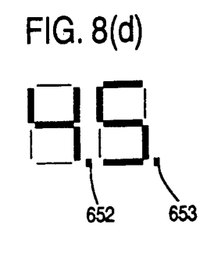

FIGS. 8(a)–8(d) show exemplary numeric displays for volume level and optimum stereo separation indication. FIG. 8(a) illustrates a display with the volume level set at 14. FIG. 8(b) illustrates a display with the volume level set at the optimum of 45. Volume indicator "v" 650 is illuminated in FIG. 8(a) to indicate a volume level display. Because the display shown in FIG. 8(a) is limited to seven segment characters, the indicator shown at 650 is meant to approximate a "v". Volume indicator "v" 650 of FIG. 8(a) becomes "o" 651 as shown in FIG. 8(b) when the optimum stereo separation level of 45 is obtained. FIG. 8(c) illustrates an alternative display with the volume level set at 14. FIG. 8(d) illustrates the display of a volume level at 45. One decimal point 652 is illuminated in FIG. 8(c) to indicate a volume level display. Two decimal points 652, 653 are illuminated in FIG. 8(d) to additionally indicate achievement of the optimum stereo separation level at 45. Controller 420 is adapted for storing a particular method of display i.e. FIGS. 8(a) and 8(b) or FIGS. 8(c) or 8(d) in controller memory. Display of volume levels and optimum stereo separation indication are possible on displays such as LED indicators, LCD indicators or CRTs, using variable length bars, LED segments or the like.

ON/OFF switch 424 turns on and off switched devices peripheral to the set top converter; for example, ON/OFF switch 424 may be a switched AC outlet 425 for powering a television or other AC powered device. A set top tuner according to the present invention is capable of volume control regardless whether ON/OFF switch 424 turns on or off switched peripheral devices. To avoid disturbing others late at night, a user may desire to turn down the volume before turning on switch 424 and its associated television receiver. Volume maybe controlled regardless of whether switch 424 has applied power to a peripheral device.

Display of the volume level is also possible regardless, whether ON/OFF switch 424 is on. Display of the volume level provides immediate visual feedback to aid a user when adjusting the volume. Circuitry in the set top converter detects when the user is commanding a volume change and illuminates the display. Under such conditions, the microprocessor and the set top converter will enable the illumination of display 422 with the selected volume level. After a predetermined time after the last input by the user, the display can be down powered. Furthermore, in another embodiment of the invention, the display can remain illuminated after an input by a user while the power is off until the power is toggled. In a further embodiment of the invention, the display can remain illuminated regardless of whether the set top converter power is on.

A set top converter can also be provided with an internal VCR timer 511 as shown in FIG. 6. Internal VCR timer 511 can be used with a VCR to turn the set top converter on and tune the set top converter to a preprogrammed channel at a preprogrammed time. Thus, an independently programmed VCR can record a television show tuned by the set top converter at the preprogrammed time. When the set top converter tunes to the preprogrammed channel using the VCR timer, the set top converter of the present invention preferably sets the volume level for optimum stereo separation. Thus, whenever internal VCR timer 511 is activated to control the set top converter, microprocessor 510 commands the attenuation of electronic volume control 412 to the optimum stereo separation level regardless of where the volume level was manually set. When internal VCR timer 511 finishes timed control of the set top converter, microprocessor 510 can return the attenuation of electronic volume control 412 to a previous volume level manually stored in memory. The previous volume level is the level set during manual operation input by the user at keyboard 423.

While the invention has been illustrated and described in detail in the drawings and the foregoing description, it will be recognized that changes and modifications can and will occur to those skilled in the art. For instance, the optimum volume control of the present invention can achieve optimum amplification of an RF signal alone without demodulation and modulation. Furthermore, the optimum volume control of the present invention can easily be applied in a VCR, a direct broadcast satellite receiver, a subscription television decoder or the like equipped with volume control rather than in a cable TV set top converter. Such adaptation may include the display features or the VCR timer features of the present invention.

What is claimed is:

1. Apparatus for use in a cable television converter for controlling audio volume, wherein said audio volume is controlled to predetermined levels and a particular level provides optimum stereo separation, the apparatus comprising:
   a demodulator for demodulating an input signal to provide an aduio signal;
   a user interface for inputting a desired volume level;
   a volume control for varying the volume of the audio signal in accordance with the desired volume level and outputting a volume controlled audio signal, the volume control including a trimming control calibrated for a volume that provides optimum stereo separation when the desired volume level is at the particular level and the volume that provides optimum stereo separation has unity gain; and
   an indicator for indicating when the volume level of the audio signal provides optimum stereo separation.

2. Apparatus for use in a cable television converter for controlling the gain of a signal, wherein said gain is controlled to predetermined levels and a particular level attains an optimum condition, the apparatus comprising:
   a user interface for inputting a desired gain level;
   a gain control for varying the gain of the signal in accordance with the desired gain level; and
   a trimming control connected in series with the gain control, the trimming control set to calibrate for a gain that attains the optimum condition when the desired gain level is at the particular level.

3. The apparatus of claim 2, further comprising a demodulator for demodulating the signal prior to control of gain by the gain control.

4. The apparatus of claim 2, further comprising:
   a timer for enabling the apparatus at a preprogrammed time; and
   a controller for setting the gain control to the particular level that attains the optimum condition, the controller setting the gain control to the particular level attains the optimum condition when the apparatus is enabled by the timer.

5. Apparatus for use in a cable television converter for controlling the gain of a signal, wherein said gain is controlled to predetermined levels and a particular level attains an optimum condition, the apparatus comprising:
   a user interface for inputting a desired gain level;
   a gain control for varying the gain of the signal in accordance with the desired gain level; and
   an indicator for indicating when the gain level of the signal attains the optimum condition.

6. The apparatus of claim 5, further comprising a trimming control connected in series with the gain control, the trimming control calibrated for a gain that attains the optimum condition when the desired gain level is at the particular level.

7. The apparatus of claim 5, wherein the particular level attaining the optimum condition has unity gain.

8. The apparatus of claim 5, further comprising a demodulator for demodulating the signal prior to control of gain by the gain control.

9. The apparatus of claim 8, further comprising a modulator for modulating the gain controlled signal.

10. The apparatus of claim 5, further comprising a controller for setting the gain control to the particular level that attains the optimum condition.

11. The apparatus of claim 10, further comprising a timer for enabling the apparatus at a preprogrammed time, the controller setting the gain control to the particular level that attains the optimum condition when the apparatus is enabled by the timer.

12. The apparatus of claim 10, wherein the optimum condition includes nearly optimum signal-to-noise ratio and distortion.

13. The apparatus of claim 10, wherein the particular level for attaining the optimum condition has unity gain through the apparatus.

14. Apparatus for use in a cable television converter for controlling the gain of a signal, the gain is controlled to predetermined levels and a particular level attains an optimum condition, the apparatus comprising:
  a user interface for inputting a desired gain level;
  a gain control for varying the gain of the signal in accordance with the desired gain level;
  a trimming control coupled with the gain control, the trimming control set to calibrate for a gain that attains the optimum condition when the desired gain level is at the particular level, wherein the optimum condition includes optimum stereo separation, and the gain that obtains said optimum condition has unity gain.

15. The apparatus of claim 14, wherein the optimum condition further includes nearly optimum signal-to-noise ratio and distortion.

16. Apparatus for used in a cable television converter for controlling the gain if a asignal, said gain is controlled to predetermined levels and a particular level attains an optimum condition, the apparatus comprising:
  a user interface for inputting a desired gain level;
  a gain control for varying the gain of the signal in accordance with the desired gain level;
  a trimming control coupled with gain control, the trimming control set to calibrate for a gain that attains the optimum condition when the desired gain level is at the particular level, wherein the optimum condition includes optimum stereo separation; and
  a modulator for modulating the gain controlled signal.

17. Apparatus for use in a cable television converter for controlling the gain of a signal, wherein said gain in controlled to predetermined levels and a particular level attains an optimum condition, the apparatus comprisng:
  a user interface for inputting a desired gain level;
  a gain control for varying the gain of the signal in accordance with the desired gain level;
  a timer for enabling the apparatus at a preprogrammed time; and
  a controller for setting the gain control to the particular level that attains the optimum condition, the controller setting the gain control to the particular level that attains the optimum condition when the apparatus oe enabled by the timer.

18. The apparatus of claim 17, further comprising a demodulator for demodulating the signal prior to control of gain by the gain control.

19. The apparatus of claim 18, further comprising a modulator for modulating the gain controlled signal.

20. Apparatus for use in a cable television converter for controlling the gain of a signal, said gain is controlled to predetermined levels and a particular level attains an optimum condition, the apparatus comprising:
  a user interface for inputting a desired gain level;
  a gain control for varying the gain if the signal in accordance with the desired gain level;
  a timer for enabling the apparatus at a preprogrammed time;
  a controller for setting the gain control to the particular level that attains the optimum condition, the controller setting the gain control to the particular level that attains the optimum condition when the apparatus is enabled by the timer, wherein the optimum condition inlcudes optimum stereo separation.

21. The apparatus of claim 20, wherein the particular level for attaining the optimum condition has unity gain through the apparatus.

22. The apparatus of claim 20, wherein the optimum condition further includes nearly optimum signal-to-noise ratio and distortion.

23. A method for use in cable television converter apparatus for controlling audio volume, wherein said audio volume is controlled to predetermined levels and a particular level provides optimum stereo separation, the method comprising the steps of:
  demodulating an input signal to provide an audio signal;
  inputting a desired volume level;
  varying the volume of the audio signal in accordance with the desired volume level and outputting a volume controlled audio signal wherein the volume that provides optimum stereo separation has unity gain; and
  incidating when the volume level of the audio signal provides optimum stereo separation.

24. A method for use in cable television converter apparatus for controlling audio volume, wherein said audio volume is controlled to predetermined levels and a particular level provides optimum stereo separation, the method comprising the steps of:
  demodulating an input signal in accordance with the desired volume level and outputting a volume controlled audio signal;
  remodulating the volume controlled audio signal; and
  indicating when the volume level of the audio signal provides optimum stereo separation.

25. Apparatus for use in a cable television converter for controlling audio volume, wherein said audio volume is controlled to predetermined levels and a particular level provides optimum stereo separation, the apparatus comprising:
  a demodulator for demodulating an input signal to provide an audio signal;
  a modulator for modulating the volume controlled audio signal output of the volume control;
  a volume control for varying the volume of the audio signal in accordance with the desired volume level and outputting a volume controlled audio signal; and an indicator for indicating when the volume level of the audio signal provides optimum stereo separation.

26. A method for use in cable television converter apparatus for controlling the gain of a signal, wherein said gain is controlled to predetermined levels and a particular level attains an optimum condition, the method comprising the steps of:
inputting a desired gain level;
varying the gain of the signal in accordance with the desired gain level; and
indicating when the gain level of a the signal attains the optimum condition.

27. The method of claim 26, wherein the particular level attaining the optimum condition has unity gain through the apparatus.

28. The method of claim 26, further comprising the step of demodulating the signal prior to control of gain.

29. The method of claim 28, further comprising the step of remodulating the gain controlled signal.

30. The method of claim 26, further comprising the step of setting the gain to the particular level that attains the optimum condition.

31. The method of claim 30, wherein the optimum condition includes optimum stereo separation.

32. The method of claim 30, wherein the optimum condition includes nearly optimum signal-to-noise ratio and distortion.

33. The method of claim 26, further comprising the steps of: enabling a peripheral control at a preprogrammed time; and setting the gain control to the particular level that attains the optimum condition when the peripheral control is enabled.

34. The method of claim 33, wherein the particular level attaining the optimum condition has unity gain through the apparatus.

35. A method for use in a cable television converter, the method for calibrating an apparatus for controlling the gain of a signal, wherein said gain is controlled to predetermined levels and a particular level attains an optimum condition, the method comprising the steps of:
inputting a desired gain level for attainment of the optimum condition;
varying the gain of a gain control in accordance with the desired gain level; and
adjusting the gain of a trimming control until the optimum condition is met.

36. The method of claim 35, wherein the gain that attains the optimum condition has unity gain through the apparatus.

37. A method for use in a cable television converter, the method for calibrating an apparatus for controlling the gain of a signal, wherein said gain is controlled to predetermined levels and a particular level attains an optimum condition, the method comprising the steps of:
inputting a desired gain level for attainment of the optimum condition;
varying the gain of a gain control in accordance with the desired gain level;
adjusting the gain of a trimming control unitl the optimum condition is met, wherein the optimum condition includes optimum stereo separation, and the gain that attains the optimum condition has unity gain.

38. The method of claim 37, wherein the optimum condition further includes nearly optimum signal-to-noise ratio and distortion.

39. A method for use in a cable television converter apparatus, the method for controlling gain of a signal, wherein said gain is controlled to predetermined levels and a particular level attains an optimum condition, the method comprising the steps of:
storing the particular level in the apparatus;
enabling the appatatus at a predetermined time; and
setting the gain of the signal to the stored particular level that attains the optimum condition when the apparatus is enabled at the predetermined time.

40. A method for use in a cable television converter apparatus, the method for controlling gain of an audio signal, wherein said gain is controlled within a range of predetermined levels and a particular level attains an optimum condition, the method comprising the steps of:
storing the particular level in the apparatus, wherein said particular level is within said predetermined levels;
enabling the apparatus at a predetermined time; and
setting the gain of the audio signal to the stored particular level that attains the optimum condition when the apparatus is enabled at the predetermined time, wherein the optimum condition includes optimum stereo separation.

41. The method of claim 40, wherein the particular level attaining the optimum condition has unity gain.

42. The method of claim 40, wherein the optimum condition further includes optimum signal-to-noise ratio and distortion.

43. An apparatus for use in a cable television converter for controlling audio volume, wherein said audio volume is controlled to predetermined levels, the apparatus comprising:
a switch having at least two states for enabling or disabling the converter in accordance with the state of switch;
a user interface for inputting a desired volume level regardless of the state of the switch; and
a volume control for varying the volume of an audio signal received by the converter in accordance with the desired volume level and outputting a volume controlled audio signal regardless of the state of the switch.

44. The apparatus of claim 43, further comprising a display for displaying the desired volume level regardless of the state of the switch.

45. An apparatus for use in a cable television converter for controlling audio volume, wherein said audio volume is controlled to predetermined levels, the apparatus comprising:
a switch having at least two states for enabling or disabling the converter, said converter receiving an audio signal;
a user interface for inputting a desired volume level regardless of whether the converter is enabled or disabled by the switch;
a volume control for varying the volume of said audio signal delivered to said device in accordance with the desired volume level and outputting a volume controlled audio signal regardless of whether the converter is enabled or disabled by the switch; and
an indicator for indicating whe the volume level of the audio signal provides optimum stereo separation regardless or whether the converter is enabled or disabled by the switch.

46. The apparatus of claim 45, comprising a trimming control coupled to the volume control, the trimming control calibrated for a volume that provides optimum stereo separation when the desired volume level is at a particular level providing optimum stereo separation.

47. The apparatus of claim 46, wherein the volume that provides optimum stereo separation has unity gain through the apparatus.

48. The apparatus of claim 46, further comprising a demodulator for demodulating an input signal regardless of the state of the switch and providing the audio signal 49. An apparatus for use with a cable television converter for controlling audio volume, wherein said audio volume is controlled to predetermined levels, the apparatus comprising:
  a switch having at least two states for enabling or disabling the converter, said converter receiving an audio signal;
  a user interface for inputting a desired volume level regardless of whether the converter is enabled or disabled by the switch;
  a volume control for varying the volume of said audio signal delivered to said converter in accordance with the desired volume level and outputting a volume controlled audio signal regardless of whether the converter is enabled or disabled by the switch;
  an indicator for indicating when the volume level of the audio signal provides optimum stereo separation regardless of whether the converter is enabled or disabled by the switch;
  a trimming control coupled with the volume control, said trimming control calibrated for a volume that provides optimum stereo separation when the desired volume level is at a particular level providing optimum stereo separation;
  a demodulator for demodulating an input signal regardless of whether the converter is enabled or disabled by the switch and providing the audio signal; and
  a modulator for remodulating the volume controlled audio signal regardless of whether the converter is enabled or disabled by the switch.

50. An apparatus for use in a cable television converter for controlling audio volume, wherein said audio volume is controlled to predetermined levels, the apparatus comprising:
  a switch having at least two states for enabling or disabling the converter, said converter receiving an audio signal;
  a user interface for inputting a desired volume level regardless of whether the converter is enabled or disabled by the switch; and
  a volume control for varying the volume of said audio signal delivered to said converter in accordance with the desired volume level and outputting a volume controlled audio signal regardless of whether the converter is enabled or disabled by the switch;
  a display for displaying the desired volume level regardless of whether the converter is enabled or disabled by the switch; and
  an indicator for indicating when the volume level of the audio signal provides optimum stereo separation regardless or whether the converter is enabled or disabled by the switch.

51. A method for use with a cable television converter for controlling audio volume, wherein said audio volume is controlled to predetermined levels, the method comprising steps of:
  enabling or disabling the cable television converter, said converter receiving an audio signal;
  inputting a desired volume level regardless of whether the converter is enabled or disabled by the switch;
  varying the volume of said audio signal delivered to said converter in accordance with the desired volume level regardless of whether the coverter is emabled or disabled by the switch; and
  indicating when the volume of the audio signal proves optimum stereo separation.

52. The method of claim 51, further comprising the steps of:
  demodulating an input signal regardless of the state of the switch to provide the audio signal; and
  remodulating the volume controlled audio signal regardless of the state of the switch.

53. The method of claim 51, further comprising the step of displaying the desired volume level regardless of the state of the switch.

54. A method for use in a cable television converter for controlling audio volume, wherein said audio volume is controlled to predetermined levels, the method comprising the steps of;
  enabling or disabling the cable television converter, said converter receiving an audio signal;
  inputting a desired volume level regardless of whether the converter is enabled or disabled by the switch;
  varying the volume of said audio signal delivered to said converter in accordance with the desired volume level regardless of whether the converter is enabled or disabled by the switch;
  displaying the desired volume level regardless of whether the converter is enabled or disabled by the switch; and
  indicating when the volume level of the audio signal provides optimum stereo separation regardless of whether the converter is enabled or disabled by the switch.

* * * * *